United States Patent [19]

Beaufort et al.

[11] Patent Number: 5,339,096
[45] Date of Patent: Aug. 16, 1994

[54] FLEXIBLE, INTUITIVE, OPERATOR FOR COMPUTER PERIPHERALS

[75] Inventors: Richard F. Beaufort, Boise, Id.; James M. Sangroniz, Brembate diSopra, Italy

[73] Assignee: Hewlett-Packard Company, Palo Alto, Calif.

[21] Appl. No.: 164,972

[22] Filed: Dec. 9, 1993

Related U.S. Application Data

[63] Continuation of Ser. No. 888,937, May 26, 1992, abandoned.

[51] Int. Cl.⁵ .................................................. G09G 3/02
[52] U.S. Cl. .................................... 345/156; 341/23; 235/145 R; 200/317
[58] Field of Search ............... 341/23, 22; 200/308, 200/310, 311, 317, 313; 40/559, 486; 235/145 R, 145 A; 345/156

[56] References Cited

U.S. PATENT DOCUMENTS

| | | | |
|---|---|---|---|
| 4,449,024 | 5/1984 | Stracener | 200/317 |
| 5,075,686 | 12/1991 | Shigemura | 341/22 |
| 5,089,690 | 2/1992 | Okamura | 235/145 R |

*Primary Examiner*—Alvin E. Oberley
*Assistant Examiner*—Minsun Oh

[57] ABSTRACT

An intuitive operator panel for machines is provided. A listing of possible functions on a transparent face is located adjacent to each multiple function control or display. A colored background viewable through the transparent face, reduces the readability of the items in the list. A moveable opaque field is located between the transparent face and colored background and increases their readability. The opaque field can be moved by the operator to highlight a desired function from the list. The desired function is highlighted in the list and the machine senses the opaque field's position to determine the function selected. Such a configuration reduces the visual clutter associated with function lists which accompany multiple function controls or displays.

12 Claims, 5 Drawing Sheets

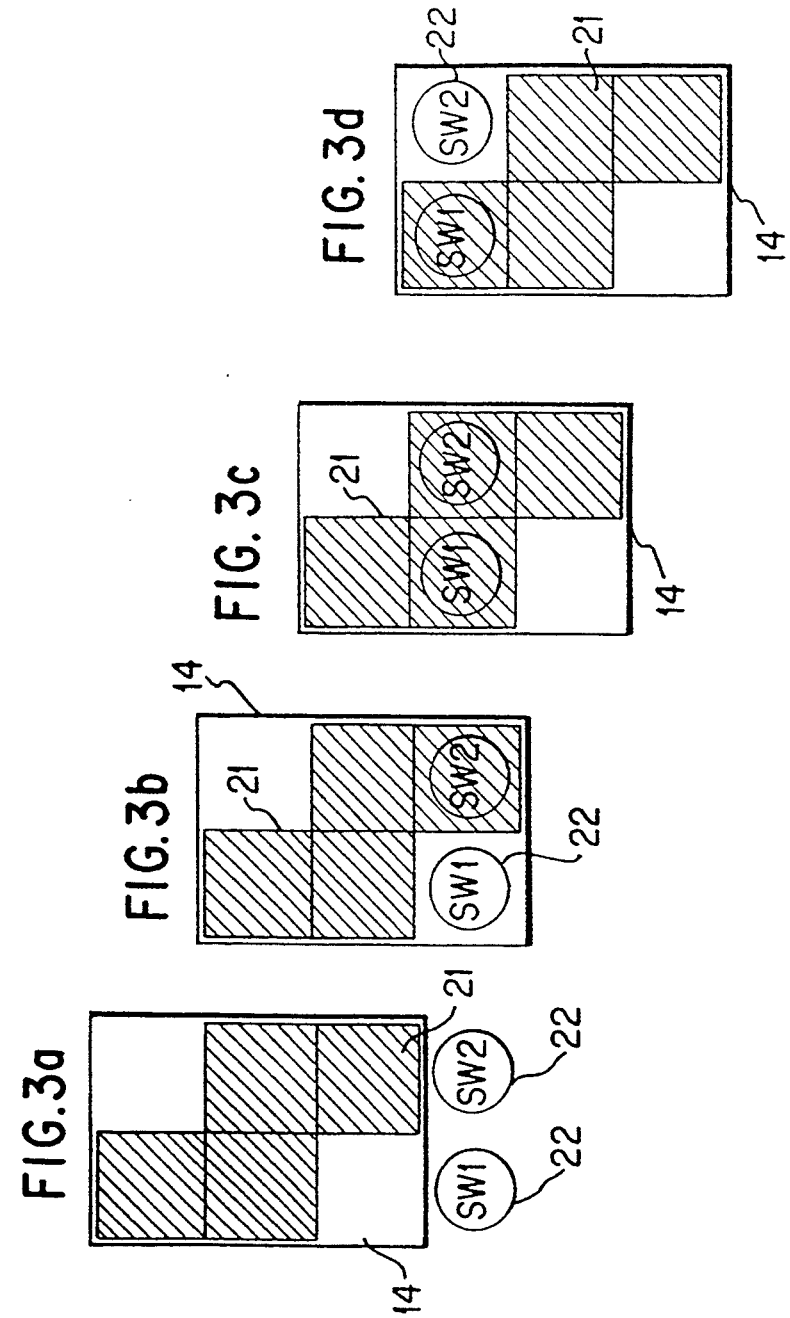
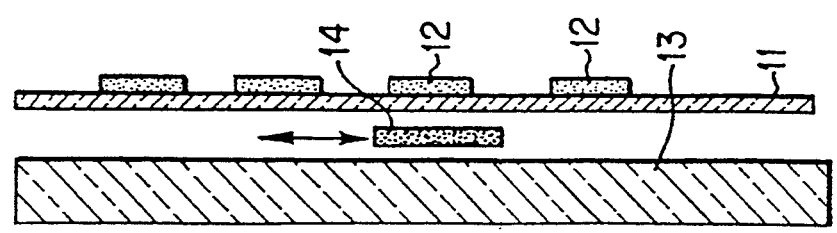

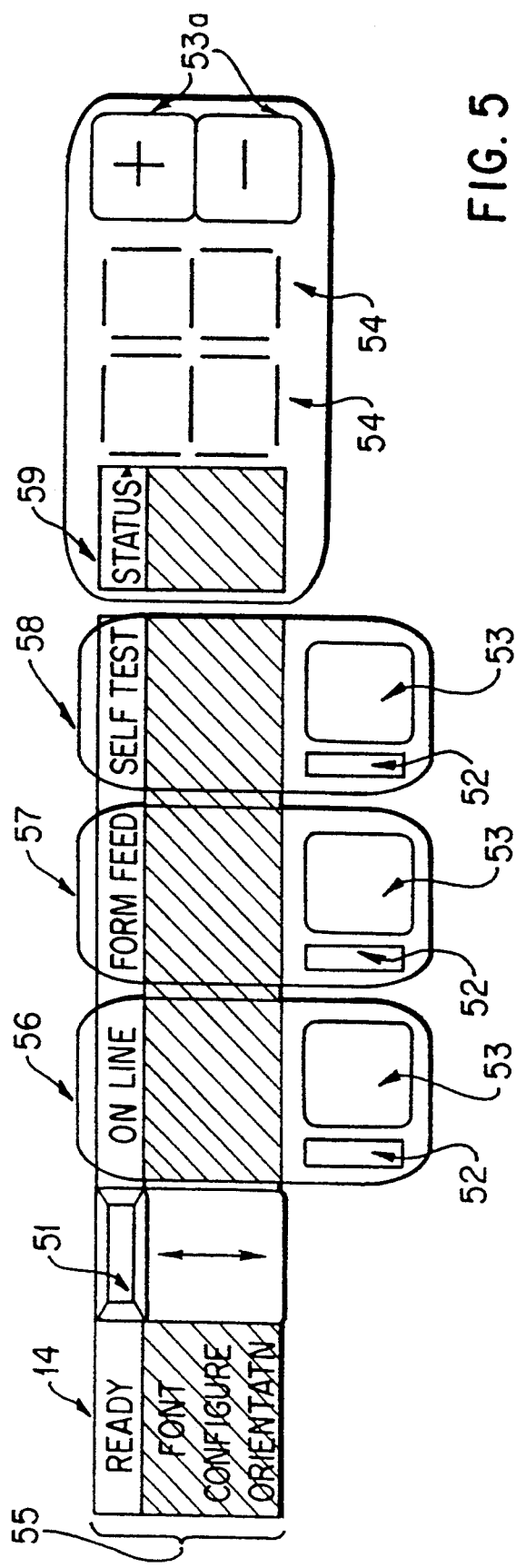

FLEXIBLE, INTUITIVE, OPERATOR FOR COMPUTER PERIPHERALS

This is a continuation of copending application Ser. No. 07/888,937 filed on May 26, 1992, now abandoned.

FIELD OF INVENTION

This invention relates to control and indicator panels associated with machinery used in the home, office or industry.

BACKGROUND OF THE INVENTION

Machines communicate to their users by various means. Inputs to a machine may be made with buttons, switches, knobs, keys, dials, and levers (input devices). A machine might communicate status to a user by lights, numeric displays, alphanumeric displays, meters, video displays, graphs, alarms or flags (output devices). Collectively these input and output devices may be called human interface devices since they act as the media of information exchange between humans and machines.

Modern machines may have a large number of functions which they are able to perform. Additionally, these machines may also have a large amount of data to present to a user or operator. Where large and complex data are exchanged between human and machine, keyboards and video displays are often used. An example of this case may be a large photocopier with its own built in video display and keyboard. Where very small amounts are exchanged, individual input devices like buttons and switches are assigned to each function. Small amounts of data may be presented to the user by output devices such as an indicator or readout assigned to each data item. An example is a multiline telephone where a button and indicator exist for each incoming telephone line. As the number of functions and status messages of a machine increases, the number of input and output devices dedicated to each function and status also increases. There is a point where such human interface devices become too numerous and costly. At this point it is common to make each human interface device perform a variety of jobs. A common example is a kitchen microwave oven where the same keypad can enter the cooking duration or the time of day. Similarly, the microwave's digital readout can display cooking time remaining or time of day. As more and more duties are heaped upon each human interface device, the possibility of confusion arises. The user must know which function is activated by which input device since each input device has numerous functions which it can activate, the function activated depending on the current state of the machine. Likewise, one output device can be made to indicate numerous status conditions of a machine as long as the user understands which status is being displayed.

Several approaches have been used to help the user know the meaning of such multiplexed human interface devices. One method is to have the user remember the previous set of inputs to the machine since the previous inputs define the current interpretation of the human interface devices. Examples of this approach are programmable digital watches where the user pushes more than one button in a sequence to enable a watch function. Another method may have dedicated output devices display the mode of the machine and dedicated input devices select the mode. From the mode the user knows how to interpret the other human interface devices. A digital alarm clock with an AM/PM indicator light is an example of a device which uses a dedicated output device to display the mode. In this example the light indicates whether the user should interpret the numbers on the clock as morning or evening time. Using a human interface device for more than one function is called multiplexing. An important point in multiplexing the use of human interface devices is for the user to know and be able to select the use of the human interface devices. Another method of multiplexing input devices is the "softkey". A softkey is a button or key on a keyboard whose function is indicated on an adjacent VDT (video display terminal) or LCD (liquid crystal display). With softkeys the descriptions (if any) written on the key do not state its current function. A portion of the VDT or LCD is reserved for descriptions of each softkey's function. In using softkeys the user reads the VDT or LCD to determine the function associated with each softkey. During the operation of the machine, the functions performed by the softkeys may change. When a softkey's function changes, the corresponding description of that softkey on the VDT or LCD will also change. By referring to the display, the user knows the current function of a softkey. Softkeys of this type are commonly found on personal computers (PCs). As the user runs different programs or portions of a program, the function of special keys (sometimes called function keys or F1 through F9) will change. Touch screens are another method of multiplexing input devices. Like the softkey, touch screens use the display (typically a VDT or LCD) to display the available input functions. In this case however there is no physical button associated with the displayed functions. A picture of the button or a picture suggesting the function (sometimes called an icon) is displayed. The user selects the function by touching the screen with a pointing device. In some implementations the pointing device is the user's finger. Sensors associated with the display detect the user's pointing device input. Still another variation is where the functions are displayed on the VDT or LCD and the user moves an indicator by means of a mouse or trackball to highlight one function. The highlighted function is then selected by depressing a button on the mouse or trackball. This method is very common on personal computers today. For output, the VDT or LCD itself is used to perform a variety of output functions. The same display is used to convey various information. The type of information displayed changes with the operating state or program being run. Some industrial applications actually have their VDTs displaying pictures of gauges or meters. The particular gauge or meter displayed changes with operating conditions.

While the use of a VDT or LCD to indicate the current function of a human interface device is intuitive; it is also expensive. Many machines might benefit from a VDT or LCD display, but the cost is prohibitive for the application. In cases where cost prevents the use of VDT or LCDs, a listing of the functions for each human interface device might be used. A common example of a function listing for a human interface device is a typewriter keyboard. Many of the keys have more than one function. The key associated with the numeral "7" for example, also may be the key for the "&" when the shift key is pressed. This is a simple case where the list has only two items. Personal computer keyboards may have function lists of three or more when used with special keys like "shift", "control" and "alternate". While this multiplexing of keys in particular (or human interface devices in general) saves cost, it becomes confusing to the user. For example, a user may not realize which of the four symbols written on a keycap is applicable at some particular moment. The key may be able to perform four functions, but which of the four functions is currently active? Scientific calculators are another example of one key performing many functions. Again the user must ask; "What function will this key perform when it is pressed?"

SUMMARY OF THE INVENTION

The object of the current invention is to intuitively indicate to the user which of the possible functions is currently enabled. The object is accomplished by listing all the possible functions of each human interface device on a transparent face. The list is readable from the front of the panel and each function's listing is spatially located next to the human interface device to which it applies. Since only one item of each list is applicable to its human interface device at any one time, the readability of the non-applicable items in the list are reduced while the readability of the applicable item is enhanced. This reduces the visual clutter of multiple functions written near each human interface device. The readability of the non-applicable (non-selected) functions is reduced by placing a colored background behind the function listing. The color is selected to provide a poor contrast with the function listing. An opaquing member located between the background and transparent face provides increased contrast for selected portions of the function list by improving the contrast for one item of the list. By moving the opaquing member, the user can select one function from a list and simultaneously read the name or description of the function. Other non selected functions are less readable due to the colored background. Additionally the machine can sense the position of the movable member through sensors and infer the function selected.

Another object of the present invention is to place a list of possible functions next to each human interface device. While all items of the list are readable, the selected item of the list is more readable. This increased readability indicates which item of the list is the function to be performed by the human interface device. The fact that all the items of the list are readable means that the user can determine what functions may be applicable to a particular interface device even though that function may not be currently selected. When the contrasting opaquing member is moved behind one item of the list, that item is made more readable. This increased readability indicates to the user that the more readable function listing is the selected function of the human interface device. The other non-selected items of the list are still readable, although reduced compared to the selected item. This readability of the non-selected items allows the user to read the choices available without moving the opaquing member to view each item.

BRIEF DESCRIPTION OF THE DRAWINGS

FIG. 1 is a profile view of the invention bowing the component parts and their respective positions.

FIGS. 3a, 3b, 3c, and 3d are planar views showing another embodiment of the movable opaquing member's position sensors.

FIG. 5 is a front view of the panel looking through the transparent face.

FIG. 6 is a frontal view of the transparent face removed from the panel.

DETAILED DESCRIPTION OF THE INVENTION

Figure 2D:
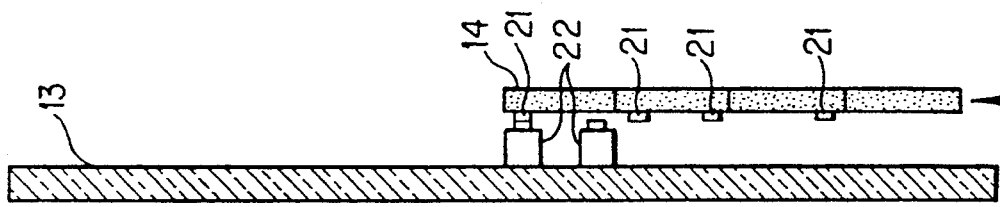
FIGS. 2a, 2b, 2c, and 2d are profile views showing one embodiment of the movable opaquing members's position sensors.
Figure 2C:
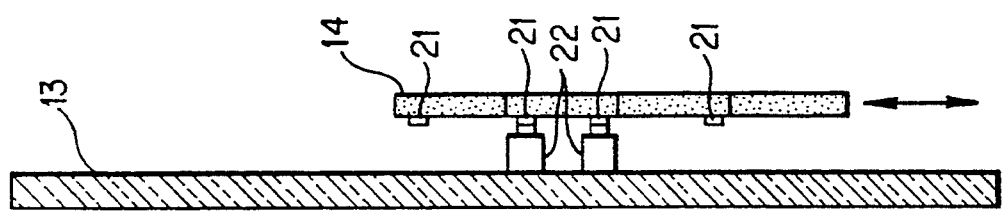
Figure 2B:
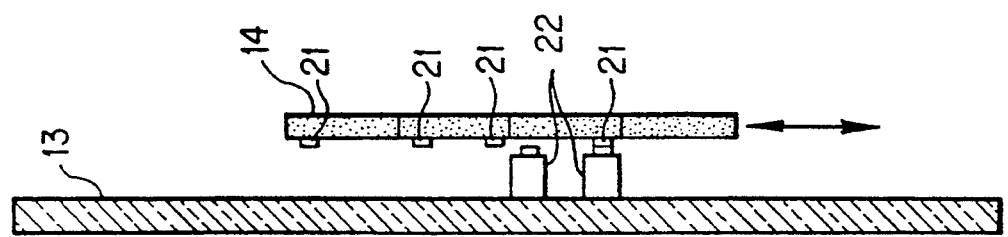
Figure 2A:
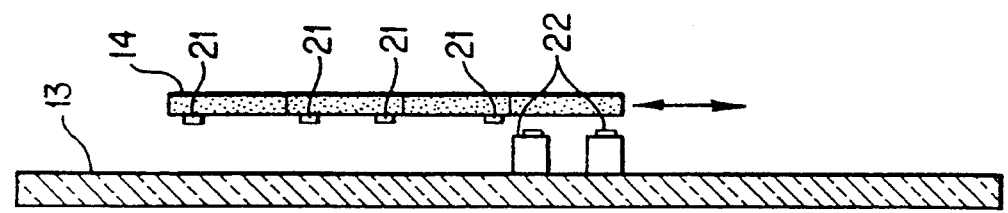

FIG. 1 is a profile view of the invention. Readable descriptions 12 are applied to a light transmissive face 11. While the term light transmissive implies translucent, frosted or transparent; the preferred embodiment employs a transparent face. The readable descriptions 12 are readable from the front side of the light transmissive face 11 which is from the right side of FIG. 1. The readable descriptions 12 may be applied to the front, back or inside of the light transmissive face. The readable descriptions 12 may be applied by screen printing, engraving, molding or other means which are well known for applying lettering, graphics and characters to clear, frosted or translucent plastic or glass windows. A colored background 13 is placed on the backside of the light transmissive face. The color of the colored background 13 is chosen to reduce the readability of the descriptions 12. This is readily accomplished by making the colored background 13 the same color as the readable descriptions 12. The resulting poor contrast between the descriptions 12 and the background 13 reduces the visibility and therefore the readability of the descriptions 12. It is not necessary that the colored background 13 be the same color as the descriptions 12, but simply chosen to reduce the readability of the descriptions 12. The preferred embodiment uses an approximate color match.

For example, the readable descriptions 12 could be a flat black color while the colored background 13 was also a flat black. This would reduce the readability of the descriptions 12 to the point where they were nearly unreadable due to the poor contrast of the descriptions 12 against the background 13. Changing the background 13 to a dark gray color would improve the readability of the descriptions 12 slightly. If the background was made a lighter shade of gray, the readability would be increased again due to the increased contrast. Lighter color combinations for the descriptions 12 and background 13 are also possible. Descriptions on background combinations such as white on white, yellow on white or white on yellow also provide poor contrast and therefore reduced readability of the descriptions over the background. Again, the reduction of readability can be controlled by choosing the contrast of the description color with the background color.

An opaquing member 14 is movably interposed between the backside of the light transmissive face 11 and the colored background 13. In FIG. 1, the opaquing member is depicted as a sliding member, but it could also be rotated or pivoted about a point. The preferred embodiment also uses a detent mechanism to provide the opaquing member with definite stops or equilibrium points. These points are chosen to make the opaquing member 14 come to rest under the various portions of the readable descriptions. The color of the opaquing member 14 is chosen to increase the visibility and therefore the readability of the descriptions 12. This is accomplished by choosing the color of the opaquing member 14 such that it provides an increased contrast relative to the descriptions 12 which is better than the contrast provided by the colored background 13. When the opaquing member 14 moves behind a portion of the descriptions 12, that portion is made more readable than the other readable descriptions 12 not in front of the opaquing member 14. The resulting increase in readability has the effect of highlighting or emphasizing that one portion of the readable descriptions.

Additionally, the relative colors of the readable descriptions 12 and the colored background 13 can be chosen to accomplish one of two effects. The first effect is where the unselected portions of the readable descriptions 12 are nearly invisible to the viewer. The only readable portion of the descriptions 12 is that portion in front of the contrasting opaquing member 14. The second effect is where the unselected portions of the descriptions 12 are still readable, but the selected portion in front of the opaquing member 14 is more readable thus giving the viewer the impression that one portion of the readable descriptions 12 has been emphasized or highlighted. This second effect is similar to the highlighting in a book where although all the material is readable, the viewer's attention is drawn to one portion. The purpose of this assembly is to have the readable descriptions 12 form a list or menu of choices. The user then can select one item from the menu or list by moving the opaquing member 14 behind the selected item. That portion of the readable descriptions 12 corresponding to the selected item is then highlighted.

For example, to accomplish the first effect described above let the descriptions 12 be black, the background 13 black, and the opaquing member 14 white. As the opaquing member 14 is moved under a portion of the descriptions 12, that portion's readability is increased due to the contrast of the black description 12 viewed in front of the white opaquing member 14. The other non-selected portions of the descriptions 12, those portions not in front of the opaquing men%her 14, have their readability reduced. This is because the non-selected black descriptions 12 are viewed against the black background 13 which does not provide as good a contrast as black over white. As the white face of the opaquing member 14 moves under various portions of the descriptions 12, those portions are made more readable due to the increased contrast of the black descriptions over a white background. The non-selected portions would be less readable due to their reduced contrast of black descriptions over a black background. The overall impression to the users will be that only the selected portion is readable, the unselected portions are nearly invisible.

To accomplish the second effect described above let the descriptions 12 be black, the background 13 be gray, and the opaquing member 14 white. As the opaquing member 14 is moved under a portion of the descriptions 12, that portion's readability is increased due to the contrast of the black description 12 viewed in front of the white opaquing member 14. The other non-selected portions of the descriptions 12, those portions not in front of the opaquing member 14, have their readability reduced but they are still readable. This is because the non-selected black descriptions 12 are viewed against the gray background 13 which does not provide as good a contrast as black over white but still provides better readability than black over black. As the white face of the opaquing member 14 moves under various portions of the descriptions 12, those portions are made more readable due to the increased contrast of the black descriptions over a white background. The non-selected portions would be less readable due to their reduced contrast of black descriptions over a gray background, but still readable. The overall impression to the users will be that all portions of the descriptions 12 are readable but the selected portion is more readable. This has the effect of emphasizing or highlighting the selected portion. This second effect allows the user to read all the items of the descriptions 12. The user is able to pick from the list. However, due to the highlighting effect, the user also can easily determine which item of the list is currently selected.

FIG. 2 shows one implementation of detection means associated with the opaquing member 14. When the user moves the opaquing member 14 of FIG. 1 to a desired selection, the machine must also have appropriate interconnect and feedback about that selection. Detection means responsive to the position of the opaquing member can indicate to the machine the position of the opaquing member and therefore the user's selection. FIGS. 2 show an implementation using a pair of push-buttons 22 actuated by protrusions 21 located on the opaquing member 14. These protrusions 21 are part of the opaquing member 14 of FIG. 1 or may be optionally mechanically linked to the opaquing member. The protrusions 21 and the buttons 22 may be hidden from view of the user. Note that the push-buttons 22 in FIG. 2 are the detection means employed by the machine to determine the position of the opaquing member. They are not the human interface devices discussed earlier. As the opaquing member 14 is moved by the user to select one item from the list of possible functions, the protrusions 21 selectively engage and actuate the buttons 22. It is the combination (one or more) of actuated buttons 22 which communicate to the machine the user's front panel choice which is selected and highlighted by the opaquing member. The panel selection information is then used by the machine to control the human interface devices to correspond with the functions indicated by the panel.

It is assumed in FIG. 2 that the opaquing member 14 has four distinct positions, each position corresponding to one portion of the list of descriptions which represent one item from a list or menu. In FIG. 2a none of the protrusions 21 depress any of the push-buttons 22. In FIG. 2b, the opaquing member 14 has moved to the next position, depressing one of the push-buttons 22. In FIG. 2c, the opaquing member 14 has moved an additional position and is depressing both push-buttons 22. In FIG. 2d the opaquing member 14 has reached the other extreme of its travel from FIG. 2a and is now depressing only one of the push-buttons 22 in yet one more unique combination. This simple binary encoding scheme allows four opaquing member positions to be encoded into two push-buttons 22. Other encoding schemes are possible such as binary encoding, gray code encoding, straight encoding with one sensor per opaquing member position or others well known in the art. Additionally, the push-buttons 22 could also be used to give the opaquing member 14 the feel of detents and four distinct positions. The invention is not limited to using pushbuttons for encoding. Capacitive, inductive, magnetic, light, hydraulic and pneumatic sensors and other well known methods could also be used depending upon the application.

FIGS. 3 show another implementation of detection means using a pair of push-buttons 22 actuated by protrusions 21 located on the opaquing member 14. These protrusions 21 are part of the opaquing member 14 of FIG. 1 or may be optionally mechanically linked to the opaquing member. The protrusions 21 and the buttons 22 may be hidden from view of the user. As the opaquing member 14 is moved by the user to select one item from the list of possible functions, the protrusions 21 selectively engage and actuate the buttons 22. It is the combination (one or more) of actuated buttons which communicate to the machine the user's front panel choice which is selected and highlighted by the opaquing member. The panel selection information is then used by the machine to control the human interface devices to correspond with the functions indicated by the panel.

It is assumed in FIGS. 3 that the opaquing member 14 has four distinct positions, each position corresponding to one portion of the list of descriptions which represent one item from a list or menu. In FIG. 3a none of the protrusions 21 depress any of the push-buttons 22. In FIG. 3b the opaquing member 14 has moved to the next position, depressing one of the push-buttons 22. In FIG. 3c, the opaquing men, bet 14 has moved an additional position and is depressing both push-buttons 22. In FIG. 3d the opaquing member 14 has reached the other extreme of its travel from FIG. 3a and is now depressing only one of the push-buttons 22 in yet one more unique combination. This simple binary encoding scheme allows four opaquing member positions to be encoded into two push-buttons 22.

FIGS. 4 show one implementation of a human interface device multiplexing scheme.

Figure 4A:
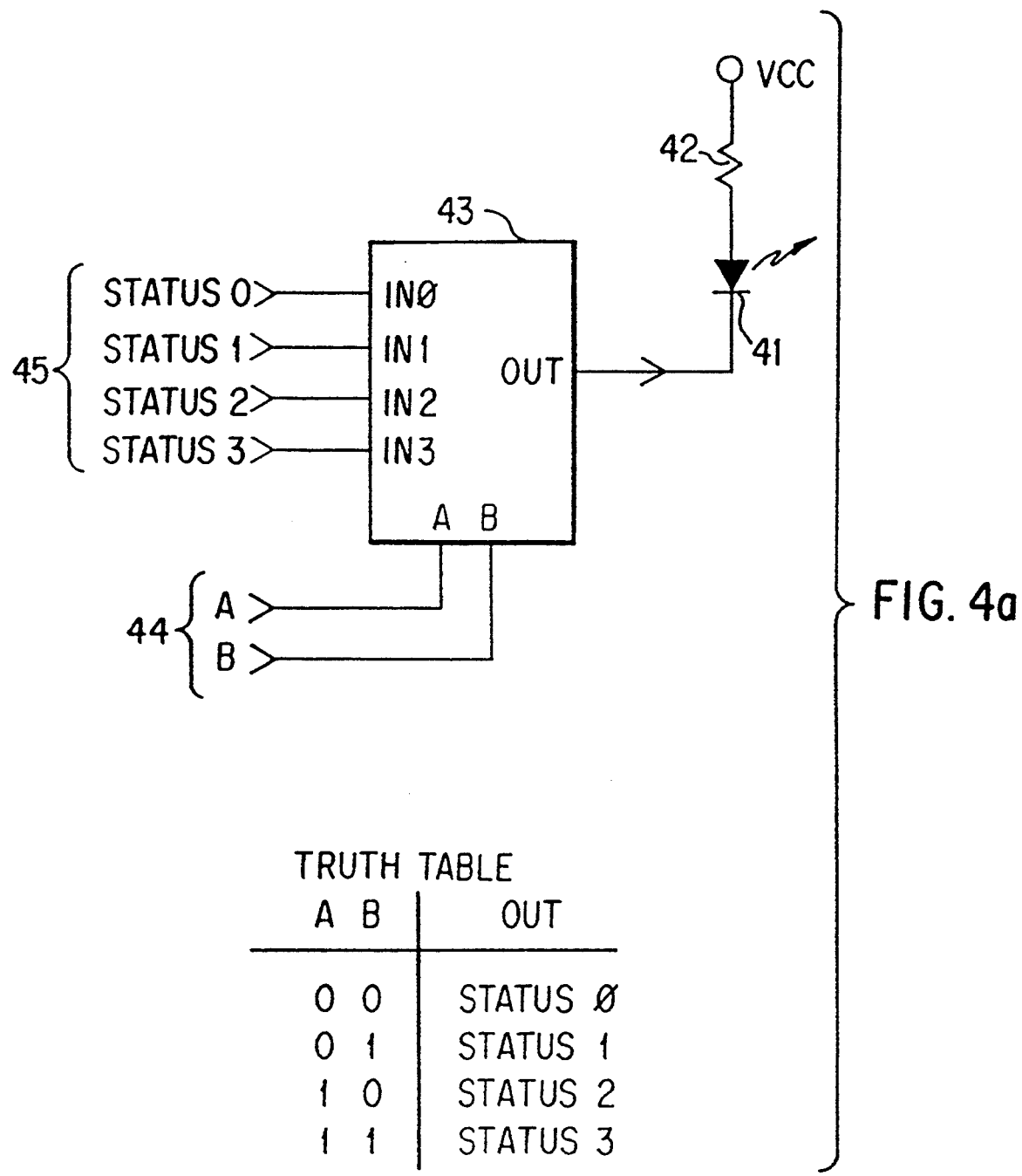
FIGS. 4a and 4b each with a truth table of signal mapping show one implementation for multiplexing the signals of output or input human interface devices.

In FIG. 4a the human interface device is a light emitting diode (LED) 41. A resistor 42 is chosen to set the necessary current to make the LED 41 visible to the operator. A multiplexer 43, selectively connects one of status signals 45 to the LED 41. The multiplexer 43 has two sets of inputs, the status inputs 45 and the selector inputs 44. The two selector inputs 44 are binary signals which determine which one of the status inputs 45 drives the LED 41. The selector inputs 44 have four possible combinations. For each of these four unique combinations of selector inputs 44, one status input from the status inputs 45 drives the LED 41. The truth table shows one possible mapping.

The status inputs 45 come from the machine to which the panel is connected. If the machine was a printer, for example the status inputs 45 could represent things like on/off line, internal/external font, spacing configuration or page orientation. The LED 41 indicates to the user one of the four status inputs 45, depending upon the value of the inputs 44.

The selector inputs 44 are the outputs of the push-buttons (detection means) 22 shown in FIGS. 2 and 3. As the opaquing member 14 is moved from one position to another, the (detection means) push-buttons 22 of FIGS. 2 and 3 change the value of their outputs. These outputs control the selector inputs 44 of the multiplexer 43.

As the opaquing member 14 highlights one item of the list associated with the LED 41, one of the corresponding status inputs 45 controls the LED 41, via the multiplexer 43. In this manner, as the displayed function of an output human interface device changes, the status signal controlling the output human interface device changes correspondingly.

Figure 4B:
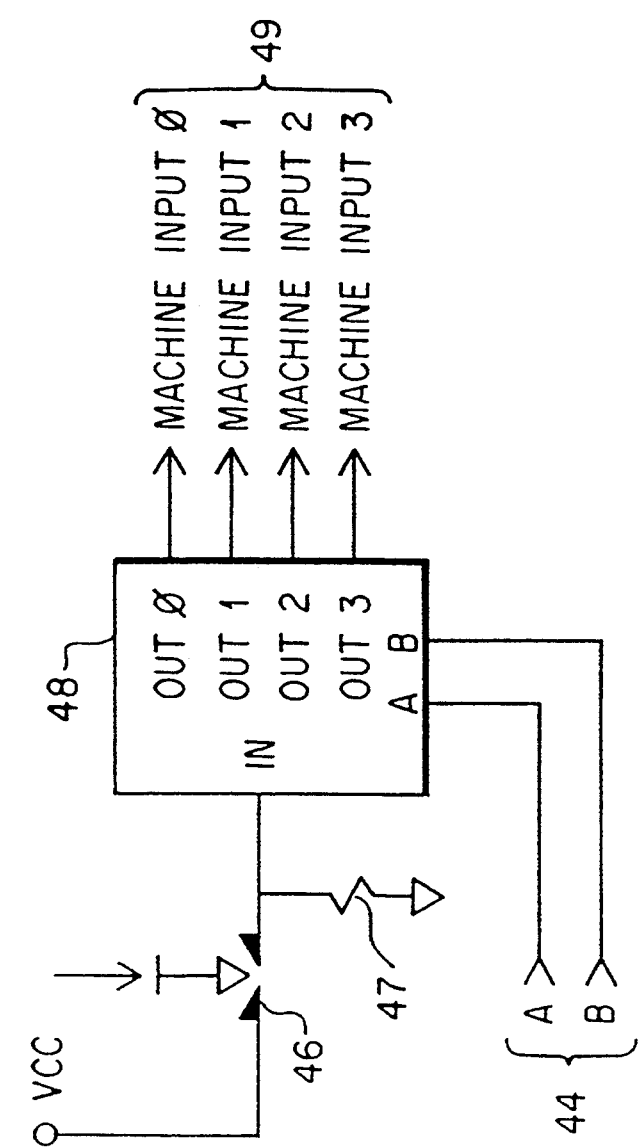

In FIG. 4b the human interface device is a momentary switch 46. A pull down resistor 47 maintains the output of the momentary switch 46 in a binary low or zero state when the momentary switch 46 is not active. When an operator activates the momentary switch 46, the output will be a binary high or one state. The momentary switch 46 acts as an input human interface device. The demultiplexer 48 selectively connects the output of the momentary switch 46 to one of the machine inputs 49.

The demultiplexer 48 has two sets of inputs, the output from the momentary switch 46 and the selector inputs 44. The selector inputs 44 are binary signals which determine which one of the machine inputs 49 is driven by the momentary switch 46. The selector inputs 44 have four possible combinations. For each of these four unique combinations of selector inputs 44, one machine input from the machine inputs 49, is driven by the momentary switch 46. The remaining of the machine inputs 49 are held to zero by the demultiplexer 48. The truth table shows one possible mapping.

The momentary switch 46 which is a human interface input device, controls the machine to which the panel is connected by the machine inputs 49. If the machine was a printer for example, machine inputs 49 could represent functions like go on/off line, select internal/external fonts, turn configuration mode on/off or select landscape/portrait page format. The momentary switch 46 allows the operator to control one of the four machine inputs 49 depending upon the value of the selector inputs 44.

The selector inputs 44 are the outputs of the push-buttons (detection means) 22 shown in FIGS. 2 and 3. As the opaquing member 14 is moved from one position to another, the push-buttons (detection means) 22 of FIGS. 2 and 3 change the value of their outputs. These outputs control the selector inputs 44 of the demultiplexer 48.

As the opaquing member 14 highlights one item of the list associated with the momentary switch 46, one of the corresponding machine inputs 49 is controlled by the momentary switch 46 via the demultiplexer 48. In this manner as the displayed function of an input human interface device changes, the machine input controlled by the input human interface device changes correspondingly.

In both FIGS. 4a and 4b, the selector inputs 44 have four unique combinations. In practice the number of combinations can be increased by adding additional selector inputs. Additionally it is not necessary to use all the combinations. The multiplexer 43 and demultiplexer 48 can be implemented by standard electronic logic, microprocessor programs or other means well known in the art.

FIG. 5 shows a front view of an operator panel employing the invention. A slide switch 51 moves the opaquing member 14 through four possible distinct positions. Although not shown in FIG. 5, the buttons 22 of FIGS. 2 and 3 provide information on the opaquing member's position to the machine. These four positions correspond to four operating modes of the panel's machine. The four modes are named "READY", "FONT", "CONFIGURE", and "ORIENTATION". A list of readable descriptions 55 lists these four modes. The second effect of having all descriptions readable while highlighting one is depicted in the list 55. The one item of list 55 "READY" is shown as being highlighted. The other three items "FONT", "CONFIGURE", and "ORIENTATION" are readable but not highlighted. The panel also includes human interface devices of various types. Two sets of push-buttons 53 act as input devices to the machine. Indicators 52 act as outputs. Numeric displays 54 act as an additional output. Each of the previously mentioned human interface devices can perform more than just one function. In this figure the panel is arranged so that the three indicators 52 are each paired with one of the buttons 53. Each of these three indicator - button pairs has a description list 56, 57 or 58 associated with it. As the slide switch 51 moves through each of its four positions, one item from the lists 56, 57 or 58 will be made readable as the opaquing member moves under it. In the current slide switch 51 position, the selected items from lists 56, 57 and 58 are "ON LINE", "FORMFEED" and SELF TEST" respectively. The two numeric displays 54 and the two buttons 53a to their right are described by another list of descriptions 59. In the figure, the item "STATUS" is the currently selected function for the numeric displays 54 and their associated buttons 53a. The first of the highlighting effects is used for lists 56, 57, 58, and 59. In each of these lists the only readily readable description is the one that is currently selected. The non-selected items of each list are nearly invisible and are depicted as being unreadable in this figure. As the slide switch 51 moves through its four positions, one item from each of five lists of readable descriptions 55, 56, 57, 58, and 59 is selected. FIG. 5 shows the slide switch at the upper extent of its travel and the opaquing member 14 (located behind the panel face) is highlighting or selecting the upper item from each of the five lists of readable descriptions. The highlighted or selected items from the lists indicate the functions to be performed by the associated human interface devices. Moving the slide switch to other positions will highlight other items of the lists thus indicating other functions to be performed by the human interface devices. The push-buttons 22 (detection means) of FIGS. 2 and 3 will indicate to the machine the position of the slide switch 51 and its associated opaquing member 14. The machine can then treat the signals of the human interface devices accordingly.

FIG. 6 is a frontal view of the light transmissive face 11 and the readable descriptions alone. This is the same light transmissive face as in FIG. 5 but with the other components removed. Note that the readable descriptions are organized into five lists or menus 55, 56, 57, 58, and 59. Because the colored background of FIG. 5 is no longer behind the light transmissive face 11, all the readable descriptions are equally readable. A further advantage of this invention is that the light transmissive face can be transparent or translucent or frosted depending upon the effect desired. Further still, Since the light transmissive face is closest to the user, it could be made removable and replaced with light transmissive faces with other languages. This feature would be an advantage to selling the product in multiple countries with various languages. Additionally the readable descriptions can also take the form of icons or pictures 62 or symbols 63.

What is claimed is:

1. A panel for displaying a list of the functions of a human interface device, and selecting one item from said list at a time comprising:
   a light transmissive face including a plurality of readable descriptions, said readable descriptions listing the possible functions of said human interface device, said light transmissive face having a front side and a backside, all of said readable descriptions being readable from said front side;
   a colored background located in close proximal relationship to said backside of said light transmissive face, the color of said colored background selected to cause a reduction in readability of said readable descriptions when viewed from said front side; and
   an opaquing member movably interposed between said light transmissive face and said colored background to selectively diminish said reduction in readability of a selected portion of said readable descriptions thus visually indicating said one item of said list to be performed by said human interface device, all of said readable descriptions remaining readable from said front side.

2. A panel according to claim 1 further comprising: detection means to determine which selected portion of said readable descriptions has been made readable by said opaquing member.

3. A panel according to claim 2 further comprising multiplexing means responsive to said detection means to enable one of said possible functions to be performed by said human interface device.

4. A panel according to claim 1 further comprising means for displaying a plurality of lists of the functions of a plurality of human interface devices and selecting one item at a time from each of said lists.

5. A panel according to claim 1 wherein the color of said colored background is selected to cause said descriptions to be substantially unreadable when said descriptions are viewed in front of said colored background.

6. A panel according to claim 1 wherein the color of said colored background is selected to cause said descriptions to be readable when said descriptions are viewed in front of said colored background, but less readable than when said descriptions are viewed in front of said opaquing member, thus giving the visual impression that said readable descriptions in front of said opaquing member have been highlighted.

7. A panel for displaying a list of the functions of a human interface device, and selecting one item from said list at a time comprising:
   a light transmissive face including a plurality of readable descriptions, said readable descriptions listing the possible functions of said human interface device, all of said readable descriptions remaining readable, said light transmissive face having a front side and a backside, all of said readable descriptions being readable from said front side;
   a colored background located in close proximal relationship to said backside of said light transmissive face, the color of said colored background selected to cause a poor contrast with said descriptions when said descriptions are viewed from said front side, thus making said descriptions less readable; and
   an opaquing member movably interposed between said light transmissive face and said colored background, the color of said opaquing member selected to provide improved contrast with said readable descriptions when said readable descriptions are viewed from said front side, thus making said descriptions in front of said opaquing member readable, and further visually indicating one item of said possible functions to be performed by said human interface device.

8. A panel according to claim 7 further comprising detection means to determine which selected portion of said readable descriptions has been made readable by said opaquing member.

9. A panel according to claim 8 further comprising multiplexing means responsive to said detection means to enable one of said possible functions to be performed by said human interface device.

10. A panel according to claim 7 further comprising means for displaying a plurality of lists of the functions of a plurality of human interface devices and selecting one item at a time from each of said lists.

11. A panel according to claim 7 wherein the color of said colored background is selected to cause said descriptions to be substantially unreadable when said descriptions are viewed in front of said colored background.

12. A panel according to claim 7 wherein the color of said colored background is selected to cause said descriptions to be readable when said descriptions are viewed in front of said colored background, but less readable than when said descriptions are viewed in front of said opaquing member, thus giving the visual impression that said readable descriptions in front of said opaquing member have been highlighted.

* * * * *